(12) United States Patent
Happ

(10) Patent No.: US 6,299,102 B2
(45) Date of Patent: *Oct. 9, 2001

(54) AVIATION CRASH SENSOR

(75) Inventor: Michael J. Happ, Scottsdale, AZ (US)

(73) Assignee: H. Koch & Sons, Inc., Anaheim, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,338

(22) Filed: Mar. 12, 1998

Related U.S. Application Data

(63) Continuation-in-part of application No. 08/832,874, filed on Apr. 4, 1997, which is a continuation of application No. 08/439,955, filed on May 12, 1995, now abandoned.

(51) Int. Cl.$^7$ .................................................. B64D 25/02
(52) U.S. Cl. ................................ 244/122 AG; 244/122 R
(58) Field of Search ........................ 244/122 AG, 118.5, 244/121, 122 R; 280/806

(56) References Cited

U.S. PATENT DOCUMENTS

| | | | | |
|---|---|---|---|---|
| 3,178,136 | * | 4/1965 | Bayer | 244/122 AG |
| 3,522,918 | * | 8/1970 | Wrighton | 280/806 |
| 4,121,792 | * | 10/1978 | Danielsen | 244/122 AG |
| 4,667,904 | * | 5/1987 | Herndon | 244/122 AG |
| 4,967,985 | * | 11/1990 | Deakin | 244/122 AG |
| 5,039,035 | * | 8/1991 | Fitzpatrick | 244/121 |
| 5,301,902 | * | 4/1994 | Kalberer et al. | 244/118.5 |
| 5,362,098 | * | 11/1994 | Guill | 244/122 AG |
| 5,415,431 | * | 5/1995 | Omura | 280/806 |

* cited by examiner

*Primary Examiner*—Charles T. Jordan
*Assistant Examiner*—Tien Dinh
(74) *Attorney, Agent, or Firm*—Edgar W. Averill, Jr.

(57) ABSTRACT

An aircraft crash sensor activates an aircrew safety device upon sensing an aircraft impact in any direction to minimize the aircrew flail envelope and reduce the possibility of injury caused by the crash. The crash sensor is useful in a plurality of different aircraft all having different characteristics and mounting orientations for the crash sensor. It includes accelerometers which sense accelerations along three orthogonal axes. The memory contains algorithms for each of a plurality of different aircraft. The memory also contains a program which converts the acceleration data measured along the sensor's axes to acceleration data on the aircraft's orthogonal X, Y and Z axes. These converted acceleration signals are input to a microcontroller which evaluates them, by analyzing them with an algorithm contained in non-volatile programmable memory, to determine when a crash has occurred. If a crash is determined, an output signal is provided to operate an aircrew restraint system which secures aircrewmen in their seats, or to air bags or other safety systems. Measured data is stored in memory for future retrieval.

10 Claims, 6 Drawing Sheets

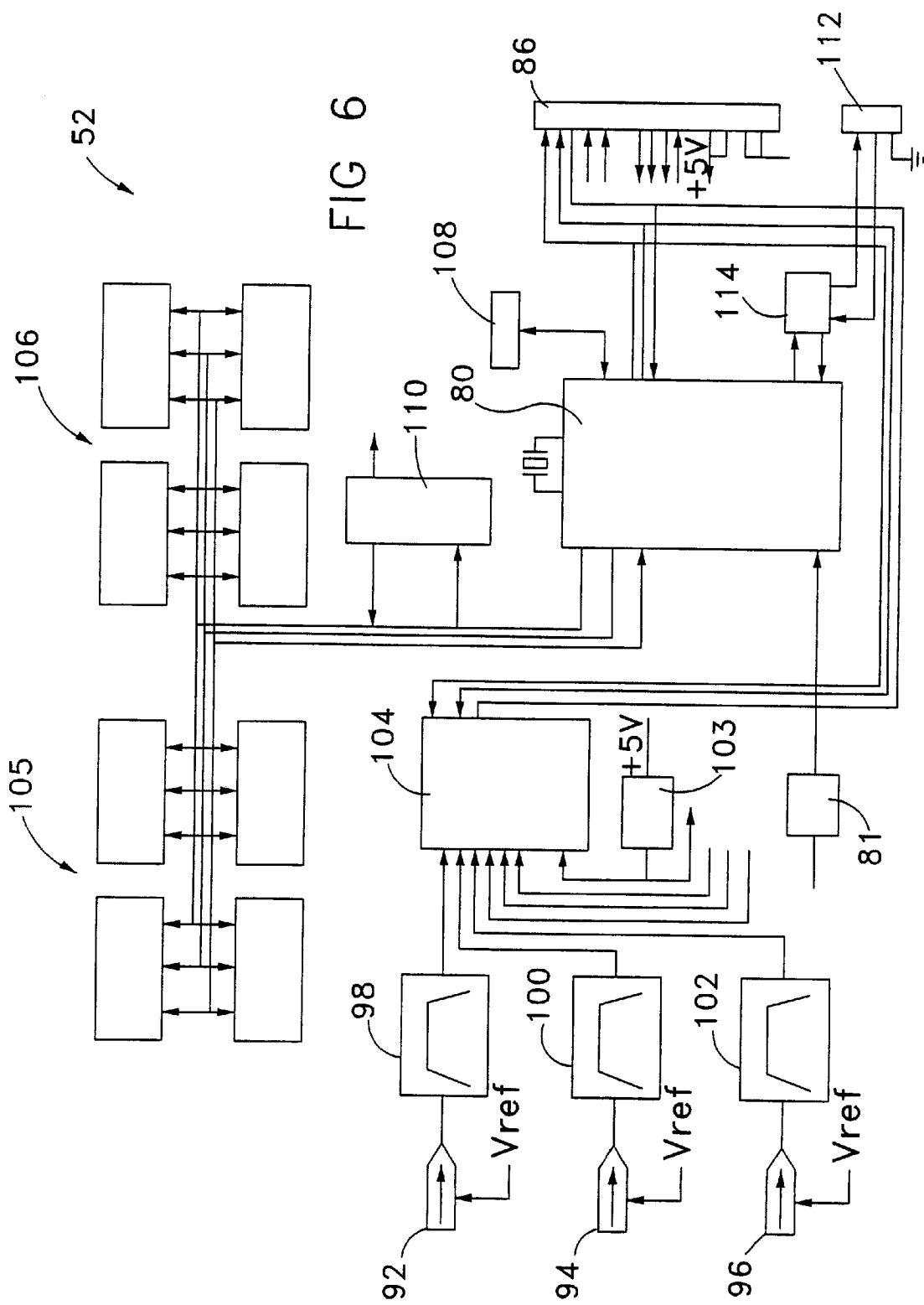

AVIATION CRASH SENSOR

CROSS-REFERENCE TO RELATED APPLICATIONS

This application is a continuation in part of application Ser. No. 08/832,874, filed Apr. 4, 1997, which was a continuation of application Ser. No. 08/439,955, filed May 12, 1995, now abandoned.

BACKGROUND OF THE INVENTION

This invention relates generally to aviation crash sensors and, more particularly, to a crash sensor which senses acceleration along three orthogonal axes and processes acceleration vector data to detect an omnidirectional crash.

Mechanical acceleration threshold detection devices have been used in the automotive industry to lock seat belt retractors to restrain occupants in their seats in the event of a sensed threshold acceleration along the vehicle longitudinal axis to indicate a frontal crash. These devices are normally mechanical devices utilizing a pendulum or a ball-and-ramp arrangement to sense acceleration in one or two planes. Recently, TRW has developed a seat belt tensioning retractor for Mercedes-Benz that is activated by the automobile on-board computer when it senses a 0.7 G frontal impact to pretension the passenger seat belts.

With the advent of air bags, electronic accelerometers have been devised to actuate air bags. Such electronic accelerometers are illustrated in U.S. Pat. No. 3,762,495—Usui et al and U.S. Pat. No. 4,984,464—Thomas et al. However, none of these automotive crash sensing devices or systems is useful for detecting crashes which do not occur in the horizontal plane of vehicle operation, such as rollover crashes.

Mechanical accelerometers have also been used in the aircraft industry to activate a safety device, such as to lock an aircraft occupant's shoulder harness retractor or to tighten the harness when a threshold acceleration is sensed. A crash sensor for an airplane was previously developed to cut out the electrical circuit, cut off fuel and operate fire extinguishers when a crash was detected, as shown in U.S. Pat. No. 2,573,335. However, these accelerometers are mechanical and react relatively slowly to a crash, thus slowing activation of the safety devices.

An impact indicator was previously developed to detect when aircraft landing gear has been stressed beyond predetermined critical limits. U.S. Pat. No. 3,389,607—Kishel discloses such a system, which utilizes a complex mechanical triaxial acceleration sensor.

Many aircraft crashes or impacts are not necessarily catastrophic, in that they could be survivable by the aircrew if movement of the aircraft occupants during the crash is restrained. For example, helicopters may suffer engine or rotor failures as a result of combat damage or other malfunctions, which will cause a relatively low-speed crash. These crashes could be survivable by the aircrew if the aircraft crewmen were quickly secured in their seats in a manner to limit their so-called "flail envelope".

It would be desirable to provide a crash sensor having three-axis sensing which compares aircraft accelerations to a crash algorithm for each of a variety of different aircraft.

It would also be desirable to provide a crash sensor which automatically identifies the aircraft mounting orientation and automatically converts sensed accelerations into vehicle axis equivalents.

It would further be desirable to provide a method of and apparatus for evaluating vehicle acceleration data for a plurality of different vehicles having axes which are different from the measurement axes to identify a predetermined event.

SUMMARY OF THE INVENTION

It is an object of this invention to provide a crash sensor having three-axis sensing which compares aircraft accelerations to a crash algorithm for each of a variety of different aircraft.

It is another object of this invention to provide a crash sensor which automatically identifies the aircraft mounting orientation and automatically converts sensed accelerations into vehicle axis equivalents.

It is a further object of this invention to provide a method of, and apparatus for, evaluating vehicle acceleration data for a plurality of different vehicles having axes which are different from the measurement axes to identify a predetermined event.

An electronic crash sensor according to this invention utilizes solid-state electronic accelerometers to provide 3-axis, mutually orthogonal aircraft acceleration data to a microprocessor-based controller. The crash sensor may have a mounted orientation in which sensor axes differ from aircraft X, Y and Z axes and is programmed to convert measured data to equivalent vehicle axis data. The sensor periodically samples the acceleration signals from the accelerometers and internal signals, converts them to digital format, converts them to vehicle equivalent accelerations, and processes these signals under control of a crash-detection algorithm to detect a crash threshold. By modifying key processing parameters from an external computer, the controlling programs may be tailored to a variety of different vehicles and physical mounting orientations.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 6 is a schematic diagram of the crash sensor logic circuitry; and

DETAILED DESCRIPTION OF A PREFERRED EMBODIMENT

Figure 1:
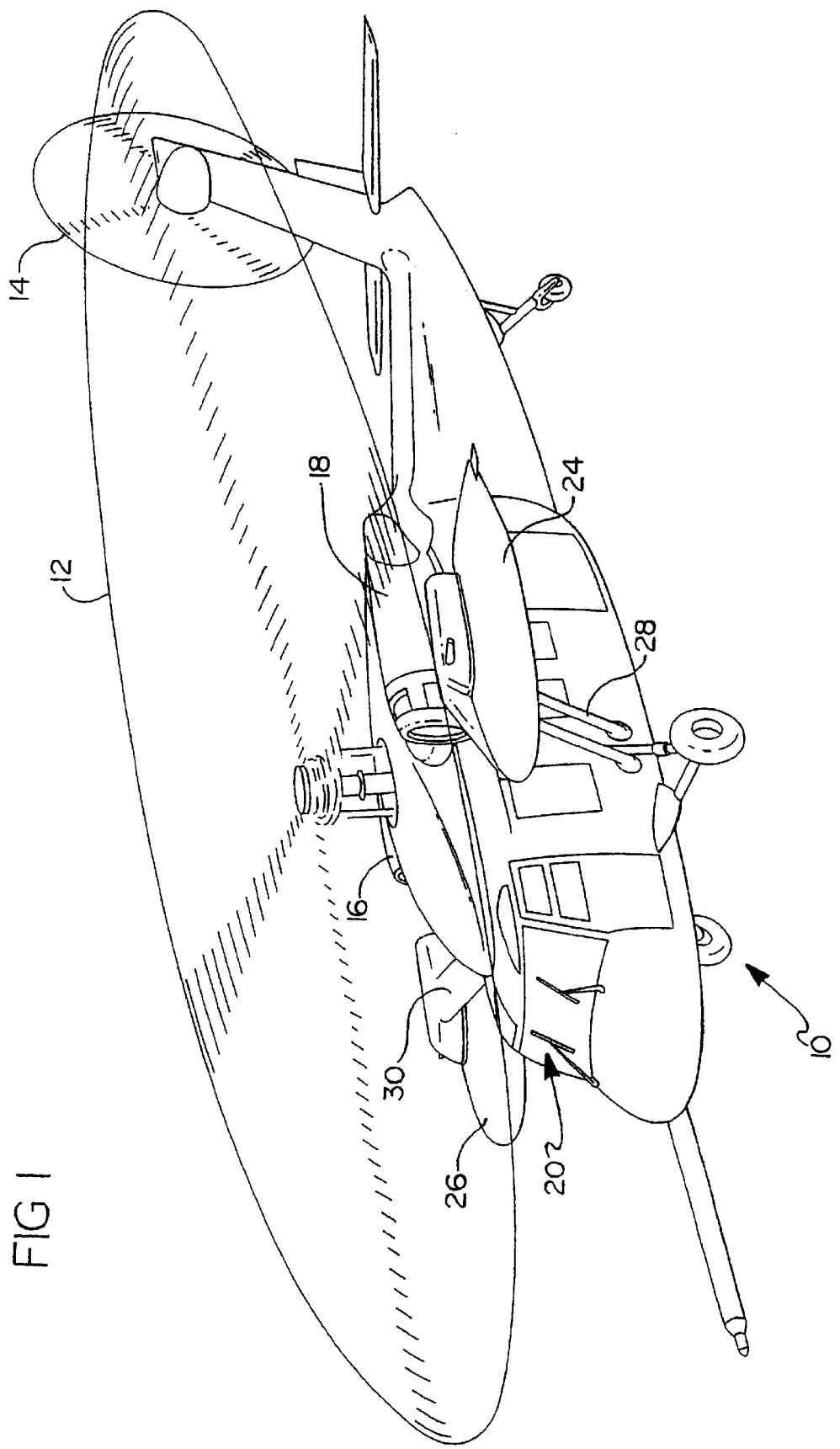
FIG. 1 is a perspective view of a helicopter shown in flight, which incorporates a crash sensor according to this invention.
Figures 2, 3:
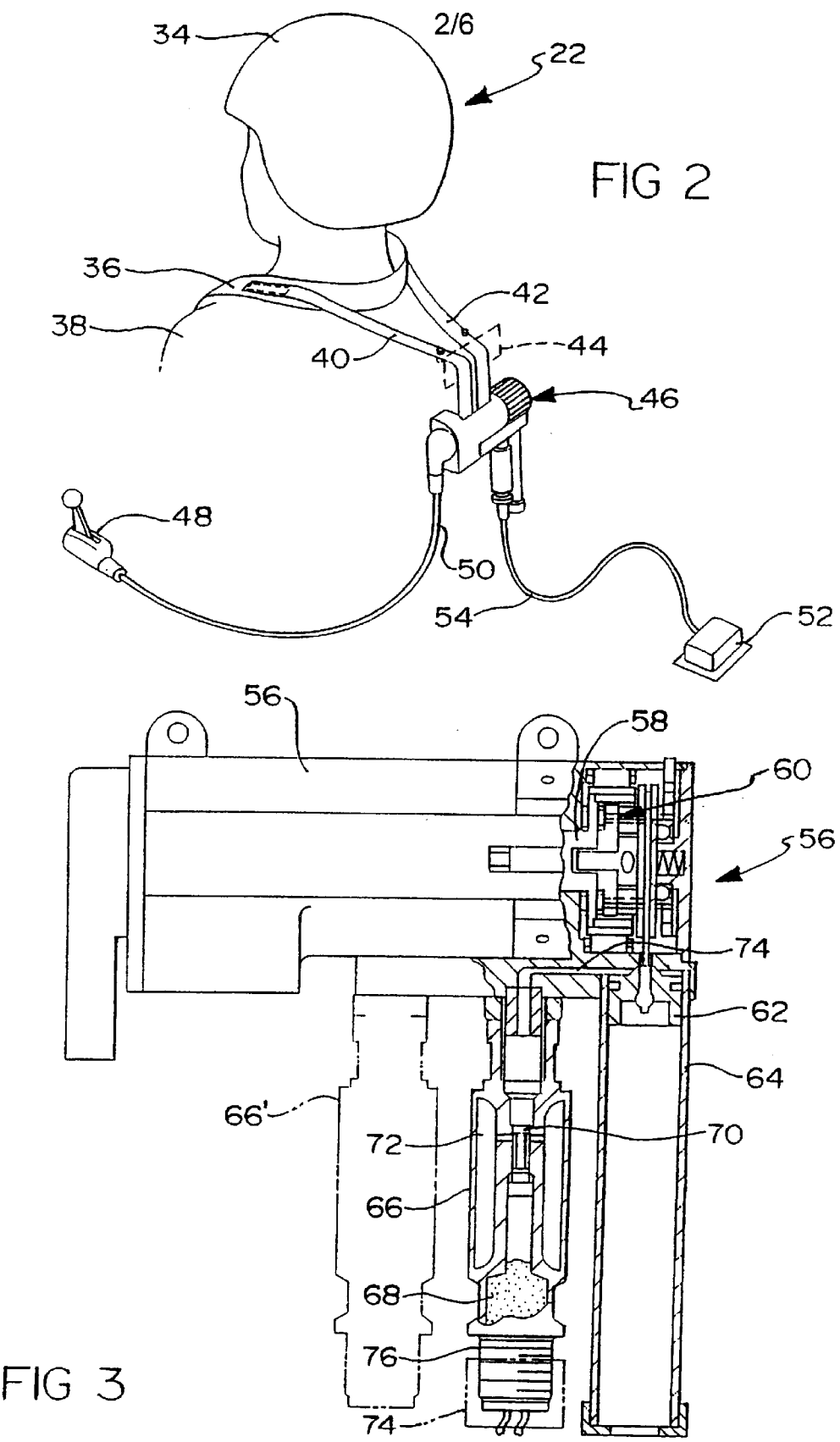
FIG. 2 is a partial perspective view of an aircrewman wearing a safety harness that incorporates a webbing retractor that is alternatively manually operated and operated by a crash sensor according to this invention.
FIG. 3 is an enlarged plan view of the retractor of FIG. 2, partially broken away to illustrate details of construction.

FIG. 1 of the drawings shows a helicopter 10 having a main lift rotor 12 and a tail rotor 14 driven by a pair of turbine engines 16 and 18 via a transmission (not illustrated). Helicopter 10 is illustrated as a Black Hawk or Sea Hawk helicopter, but could be any helicopter or other aircraft or vehicle operating in three dimensions. Helicopter 10 includes a cabin 20 housing a pilot and copilot or other personnel, only one of which occupant 22 is shown in FIG. 2. A pair of side-mounted weapons pods 24 and 26 extend outwardly of cabin 20 on mounting arms 28 and 30.

Occupant 22 is fitted with a protective helmet 34 and a harness 36 to restrain his torso 38 in his seat (not shown) in a well-known manner. Harness 36 is a conventional, available harness such as a Model MIL-S-58095 type five-way restraint system, made by H. Koch & Sons Co. It is modified to include dual lead-in straps 40 and 42 which attach to the harness 36 and extend rearwardly through an opening 44 in the seat and downwardly into a webbing reel or retractor 46. Retractor 46 is lockable by manipulation of a manual actuator 48, via a cable 50.

In the event of a crash of helicopter 10, retractor 46 is commanded by an electronic, crash sensor unit (ECSU) 52 via an electric cable 54 to retract webbing strips 40 and 42 to secure occupant 22 in his seat, as will be described below. ECSU 52 is preferably mounted on the floor rearwardly of the seat, although the mounting and orientation will vary from vehicle to vehicle.

In FIG. 3 retractor 46 is illustrated as a modification of a Model MA-8 Inertia Reel currently produced by H. Koch & Sons, Inc., Anaheim, Calif. Retractor 46 includes a housing 56 mounting a rotatable shaft adapter 58 which connects the retractor to the inertia reel. A clutch 60 is operably connected to a retraction piston 62 which is driven within a drive cylinder 64 by a power cylinder 66. When pyrotechnic material in the form of a squib 68 within power cylinder 66 is ignited, it drives a blocking member 70 upwardly to open access of high pressure-gas in reservoir 72 to a feed channel 74. This high-pressure gas drives piston 62 downwardly in cylinder 64 to engage clutch 60 which drives reel 58 to retract webbing strips 40 and 42 to tighten harness 36 about occupant 22, securing him in his seat.

Figure 7:
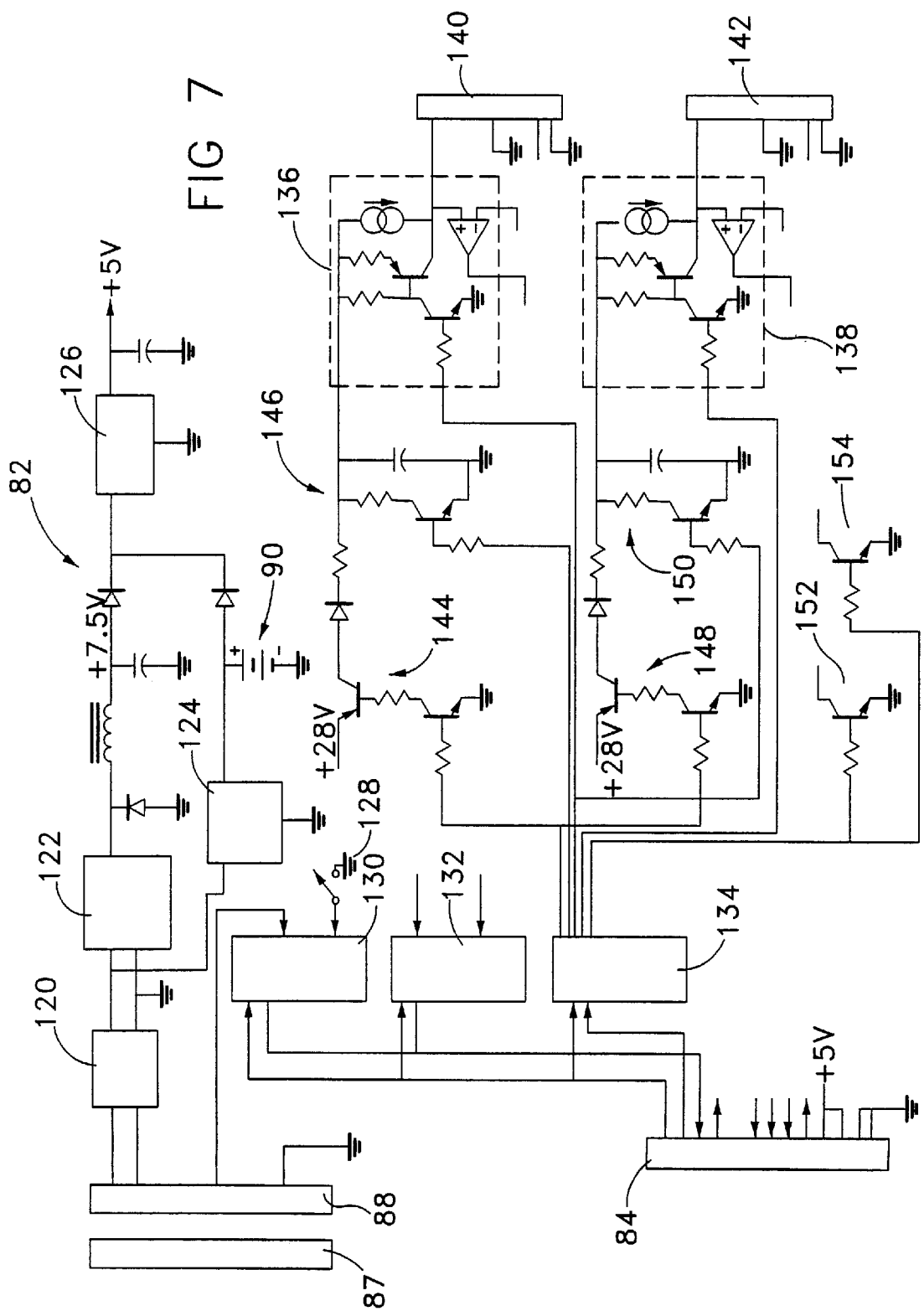
FIG. 7 is a schematic diagram of the crash sensor power circuitry.

A connector 74 operably connects the squib igniter 76 with electric cable 54 which transmits output signals from ECSU 52. Alternatively, ECSU output cable 54 can be connected to squibs which operate air bags or other safety devices. As shown in FIGS. 6 and 7, ECSU 52 comprises a microcontroller processing unit (MPU) 80, such as a Motorola Model MC68332 microcontroller, which has a power monitor 81 and is powered by a power supply 82 through interface connectors 84 and 86. As shown in FIG. 7, the source of power is normally 28 VDC aircraft power supplied by a vehicle-mounted connector 87 through a crash sensor power supply connector 88, which is then converted to 5 VDC for use by ECSU 52. Alternatively, an emergency 6-cell 7.2-VDC battery backup power pack 90 supplies power to enable operation when the main power supply fails, such as during a crash.

Vehicle power supply connector 87 contains a six-pin arrangement unique to the vehicle type. This provides 64 unique combinations of binary code to identify the specific vehicle to ECSU 52 through the interface with connector 88 so that ECSU 52 can identify the specific vehicle in which it is mounted.

Three electronic accelerometers, such as I C Sensors Model ICS 3255 accelerometers 92, 94, 96 are mounted to provide analog acceleration inputs for each of three orthogonal axes to ECSU 52. These accelerometers are arranged orthogonally to sense accelerations along three mutually perpendicular axes (X, Y and Z) and output acceleration signals for each axis through band-pass (BP) filters 98, 100 and 102 to MPU 80. Each filter's low frequency corner is suitably low to pass along acceleration pulses while blocking undesirable drift and offset characteristics of the transducers. The high frequency corner provides antialiasing and noise reduction. The acceleration signals, along with various crash sensor self-test voltages and reference voltage 103, enter a multi-channel analog-to-digital (A/D) converter 104 and are converted into binary format for use by MPU 80. Alternatively, the accelerometers could be digital, eliminating the need for A/D converter 104.

ECSU 52 operates under control of its firmware program that is resident in a 2-megabyte, non-volatile, programmable flash RAM 105, which contains a vehicle-identification axis conversion program and a crash identification program, as will be later described. ECSU sensor 52 also includes a 2 megabyte volatile, temporary CMOS RAM 106, an external debugging connector 108, a decoding chip selector 110, and a serial port 112 which connects to MPU 80 through a buffer 114.

MPU 80 incorporates a 32-bit CPU with a special time processor unit and queued serial module for integrated timing and serial data features, providing simplified, autonomous peripheral control through its high-speed serial data bus. Under program control, MPU 80 can erase and reprogram portions of flash RAM 105, allowing crash data to be collected and stored for subsequent analysis. In addition, new operating parameters as well as entire programs can be entered through serial port 112 to replace previous non-volatile information. This provides operational flexibility without any physical modifications to ECSU 52.

Connector 108 is used to initially load the programs into memory and enables debugging new program versions. Interface 86 is used for communication and control of various internal and external subsystems during operation of ECSU 52. Serial port 112 provides standard R-232 serial communications with external equipment, and enables external data collection and ECSU reconfiguration without physical entrance into ECSU 52.

In the power circuitry shown in FIG. 7, 28-VDC vehicle power enters through connectors 87 and 88, an EMI filter 120, and feeds a DC/DC buck converter 122 and a NiCAD battery charger 124. Converter 122 steps the aircraft voltage down to 7.5 VDC. Battery charger 124 cycles off and on to keep battery pack 90 fully charged. A voltage regulator 126 steps the voltage down to 5 VDC for use by the rest of the ECSU 52 circuitry. A push-button 128 is provided for self-testing ECSU 52.

Data registers 130 and 132 provide serial data to MPU 80 through interfaces 84, 86. Data register 134 receives data from MPU 80 and controls pilot squib drivers 136 and copilot squib drivers 138, which control their respective pilot and copilot restraints or other safety devices via interfaces 140 and 142. Filtered 28-VDC power is supplied to pilot bus enable 144 and discharge 146 circuitry, and copilot enable 148 and discharge 150 circuitry. Open-collector transistors 152 and 154 provide for added control of external devices, such as annunciators, not illustrated.

Upon application of vehicle power through connectors 87 and 88, ECSU 52 is operated by a program (detailed below) which executes a self-test routine to insure system operability. Failure of critical, functional circuit blocks causes ECSU 52 to cease operation and activate a maintenance alert. If the necessary circuit blocks are functioning properly, the vehicle is identified to memory via the pin configuration of connector 87 as detected by connector 88, and the vehicle-specific activation criteria are loaded into memory.

After the specific vehicle is identified, ECSU 52 begins repeatedly sampling acceleration measurements taken by accelerometers 92, 94 and 96 and converting them to accelerations along vehicle X, Y and Z axes. MPU 80 evaluates likely helicopter crash scenarios by sampling the accelerometers every 1000 microseconds, converting their analog voltage outputs into accelerations in Gs. Of course a higher or lower sampling rate (shorter or longer evaluation time) can be used, although the highest rate commensurate with system performance is desirable. MPU 80 then operates according to the above program, converting sensed acceleration data to vehicle acceleration data, and utilizing the algorithm to determine if a crash threshold has occurred. If a crash is determined, it outputs a signal through cable 54 to fire squib(s) 68 to operate cylinder 64 and retract webbing strips 40 and 42. If no crash threshold is determined, MPU 80 performs routine system monitoring and diagnostics functions detailed above.

Figure 4:
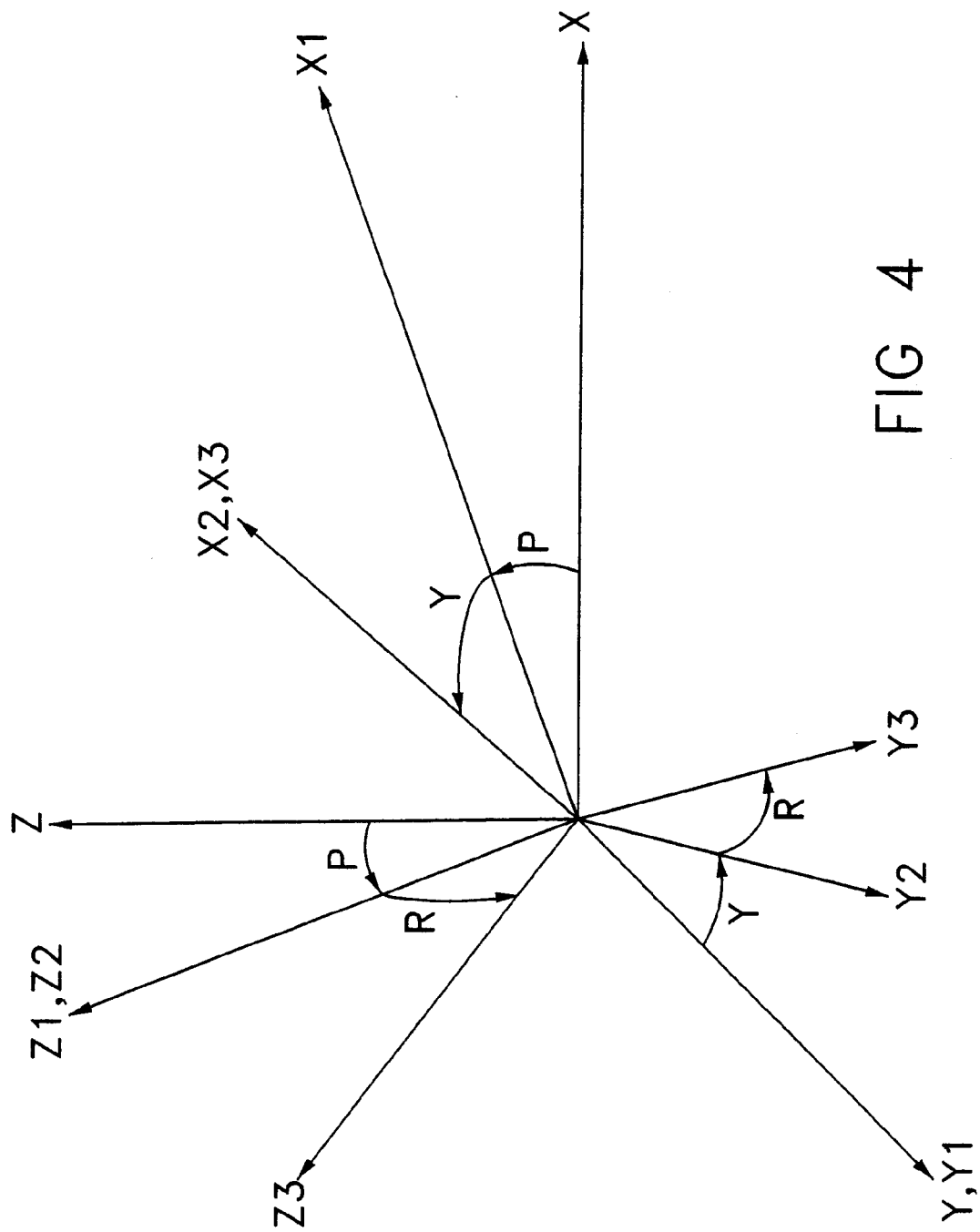
FIG. 4 is a vector diagram showing the geometric relationship of the crash sensor axes to the resident helicopter orthogonal axes.

FIG. 4 illustrates the accelerometer axis rotation which converts accelerations measured along accelerometer axes X3, Y3 and Z3 to accelerations along vehicle axes X, Y and Z.

This enables ECSU 52 to be mounted in available space in a vehicle without accurate orientation along actual vehicle X, Y and Z axes.

The conversion of the crash sensor axes to the ECSU axes, as mounted, for each vehicle type involves successively rotating the crash sensor in pitch, yaw and roll about the following rotation angles:

P: +pitch rotation about Y-axis (X-Z plane)
Y: +yaw rotation about Z-axis (X1-Y1 plane)
R: +roll rotation about X-axis (Y2-Z2 plane).

Working backward from the final, as-mounted crash sensor accelerometer coordinates X3, Y3, Z3 to the actual vehicle coordinates X, Y and Z yields:

$X = X3 (\cos Y \cos P) + Y3 ((\cos R \sin Y \cos P) + (\sin R \sin P)) + Z3 ((\sin R \sin y \cos P) - (\cos R \sin P))$ $Y = -X3 (\sin Y) + Y3 (\cos R \cos Y) + Z3 (\sin R \cos Y)$ $Z = X3 (\cos y \sin P) + Y3 ((\cos R \sin Y \sin P) - \sin R) + Z3 ((\cos R \cos P) + (\sin R \sin Y \sin P))$.

In this manner, all acceleration data received from accelerometers 92, 94 and 96 are converted into accelerations along the vehicle's X, Y and Z axes. After the acceleration data is converted, the crash detection algorithm for the host vehicle is operative to apply the data to the crash threshold criteria specific to that vehicle.

Many different algorithms can be used, utilizing acceleration and change of velocity data in many different ways. These algorithms may use predetermined acceleration thresholds, rate of velocity changes, and/or magnitude of velocity changes to determine existence of a crash threshold.

One exemplary algorithm comprises the following steps:

1. Sample accelerations and convert to vehicle orthogonal accelerations.
2. If integrator is "active"(i.e. INTEGRATION THRESHOLD reached), go to step 6.
3. Normalize converted orthogonal accelerations by dividing sensed accelerations by normalization coefficients (i.e. acceleration thresholds).
4. Square and sum normalized accelerations.
5. If resultant <1.0, NO INTEGRATION THRESHOLD; return to step 1.
6. If resultant >1.0, INTEGRATION THRESHOLD; engage recorder and integrator (for next sample); repeat sampling cycle to obtain next sample.
7. Integrate current sample orthogonal accelerations to obtain orthogonal changes in velocity and add to cumulative changes in velocity.
8. Normalize cumulative orthogonal changes in velocity by dividing by normalizing coefficient (i.e. VELOCITY THRESHOLDS).
9. Raise normalized changes in velocity to a programmable power and sum.
10. If resultant <1.0, NO CRASH; return to step 1.
11. If resultant $\geq$1.0, POSSIBLE CRASH THRESHOLD:
    a. If integrator active <0.005 sec., assume NON-CRASH THRESHOLD, deactivate integrator, return to step 1.
    b. If integrator active $\geq$0.100 sec., event too slow; deactivate integrator; return to step 1.
    c. If integrator active between 0.005–0.100 sec., CRASH THRESHOLD; actuate safety devices and start CRASH THRESHOLD data recorder.

This rapid evaluation and response assures that, in the event of a crash, harness 36 is instantaneously retracted to reduce the amount of movement by occupant 22, which significantly reduces the "flail envelope" and the incidence of occupant injury. This data is stored in 60-second increments, 40 seconds before a sensed crash threshold and 20 seconds following. Backup power supply 90 assures operation of ECSU 52 in the event of a power failure caused by a crash or other vehicle damage. Another exemplary algorithm uses a plurality of different sized moving windows of integrated velocity changes to determine existence of a crash threshold.

One exemplary operational program for operating ECSU 52 is:

```
INTERRUPT SERVICE ROUTINE: 28V Power Fail (NMI)
connect the battery
power fail timer=power fail delay
exit
INTERRUPT SERVICE ROUTINE: Timer
increment ECSU timer
decrement sample timer
if (sample timer=0 and OK to start QSM)
   restart QSM to initiate all I/O
if (sample timer=0)
   reset timer=sample interval
if (receive character timeout)
   handle incoming message exception
if (transmit character timeout)
   handle outgoing message exception
if (power fail timer >0)
   decrement power fail timer
   if (power fail timer=0)
      power fail timer=-3
      if (28V≧28V low limit)
         disconnect battery
      else
         set power fail flag
if (capacitor discharge time >0)
   decrement discharge timer
   if (discharge timer=0)
      discharge timer=-3
if (firing pilot squib)
   decrement pilot squib timer
   if (pilot squib timer=0)
```

```
pilot squib timer=-3
turn off pilot squib fire command
if (firing copilot squib)
   decrement copilot squib timer
   if (copilot squib timer 0)
      copilot squib timer=-3
      turn off copilot squib fire command
exit
MAIN PROGRAM:
initialize ECSU hardware and software
enable specific MPU interrupts
increment startup count
perform ECSU self-test
enable comm port interrupts
enable TPU interrupts for press-to-display
if (self-test status is not halt)
   initialize power board control
   get aircraft ID
   clear comm port and check for host
   if (event data is in flash RAM and there isn't a host
      computer connected)
      copy flash data to CMOS RAM
      erase flash RAM
   initialize math items
if (flash data exists)
   increment power startup count
clear data available flag
while (not halted i.e., passed self-tests)
   while (no data available)
      if (no crash and no event and no sample and no power
         failure)
         while (no data available or crash data already in flash)
            if (no interrupts enabled)
               enable interrupts
            if (no host computer connected)
               clear comm port and check for host
            if (host computer connected)
               check for message and process as
               required
            if (press-to-display switch active)
               activate all display indicators
               deactivate all display indicators
               display failure code using LEDs
               extinguish LEDs
            if (power failure)
               set status to halt
               set data available flag
            else if (QSM not OK)
               clear data available flag
         clear data available flag
         point to new data
      if (not halted i.e., don't already have SE/CE)
         get raw acceleration data
         convert to Gs
         perform coordinate frame conversion
         if (no crash has occurred yet)
            if (acceleration threshold exceeded)
               if (no current event)
                  reset integrator to begin integration
                  disable host comm and press-to-display interrupts
                  record event time
                  reset power startup counter
                  set event flag
                  set sample flag
                  set amount of additional SE data to collect
                  increment event counter
               set SE threshold bit in status
               record event time
            if (event has been detected)
               turn on integrator
               if (neither pilot nor copilot bags have fired)
                  calculate ΔV
                  if (velocity threshold exceeded)
                     increment velocity index
                     if (velocity index ≧max. window)
                        set sliding integrator window flag
                        reset velocity index
                     if (time >minimum event duration)
                        if (no crash so far)
                           record crash time
                           set amount of additional CE data to take
                           set crash flag
                           increment crash index
                        if (outside exclusionary cones)
                           if (pilot override not active)
                              fire pilot squibs
                           if (copilot override not active)
                              fire copilot squibs
                           if (either pilot or copilot squib fired)
                              set squib fired flag
                              increment fire count
                        else
                           reset integrator and ignore accel. spike
                  else
                     update velocity pointers
               else
                  update velocity pointers
               if (sliding flag set)
                  check window and slide if necessary
               switch ring buffer if necessary
               if (no sample flag i.e., no SE/CE in progress)
                  if (power fail)
                     set status=halt
                  else if (power fail)
                     set power fail bit in status word
turn off LEDs except 7
allow QSM to continue
turn off pilot power bus
turn off copilot power bus
discharge pilot caps
discharge copilot caps
save any SE/CE data into flash RAM
wait for remaining capacitor discharge time
disconnect battery
if (no event and 28V power >28V low limit)
   restart ECSU.
END
```

Figure 5A:
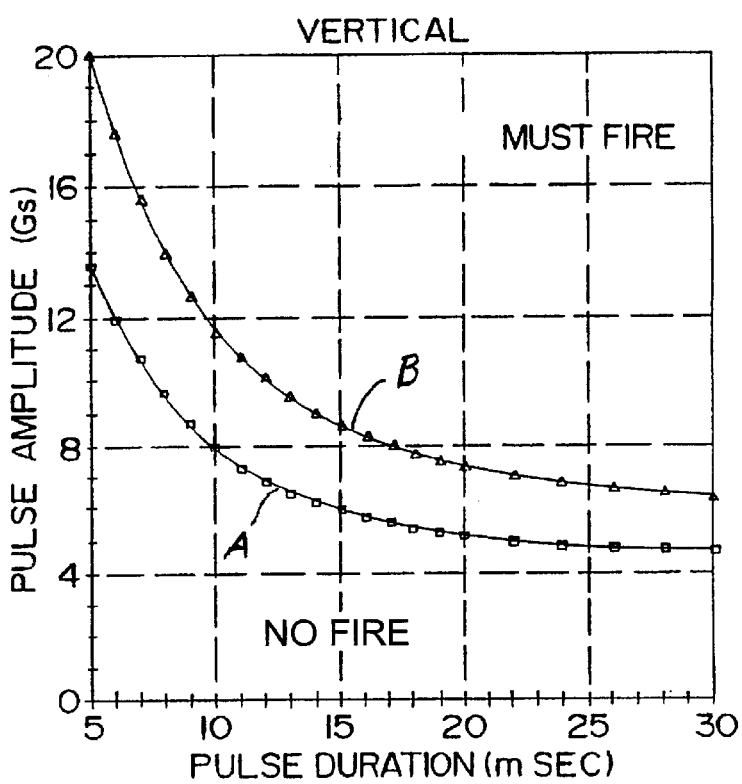
FIGS. 5a and 5b are diagrams plotting the vertical and horizontal fire/no fire criteria used in evaluating helicopter accelerations to determine existence of a crash threshold and output a signal to fire a squib.
Figure 5B:
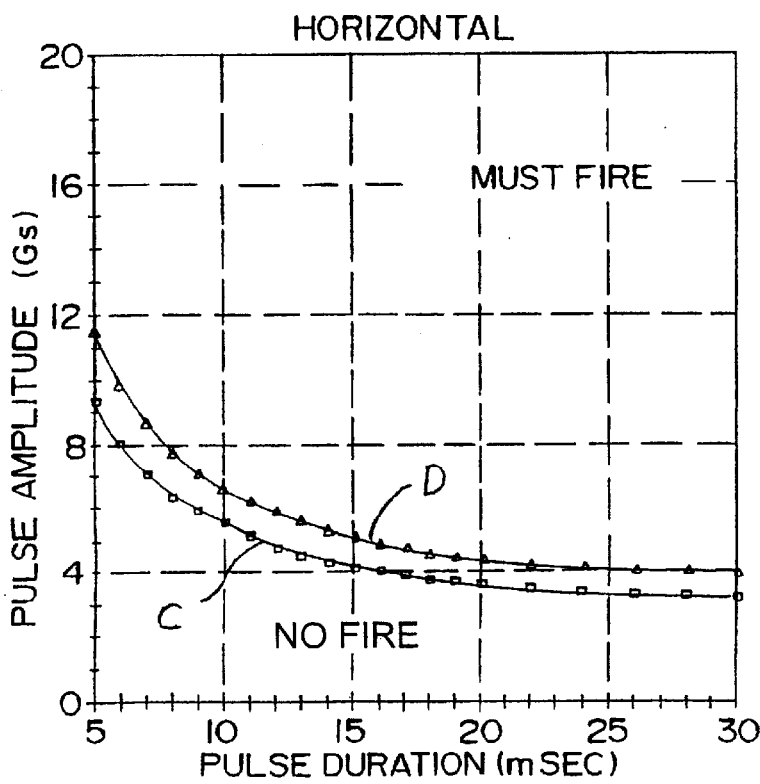

Each helicopter or other vehicle will have different acceleration and velocity change criteria for determining occurrence of a crash threshold. FIG. 5a plots vertical accelerations vs. time for the helicopter of FIG. 1. The area below a first curve A illustrates vertical Z-axis acceleration conditions under which ECSU 52 must issue a "no fire" signal, while the area above a second curve B provides vertical Z-axis acceleration conditions under which ECSU must issue a "fire" signal. Similarly, in FIG. 5b, the area below a curve C shows horizontal (X-axis and Y-axis) acceleration conditions under which no output or "no fire" signal is commanded, while a second curve D provides horizontal acceleration conditions under which an output or "fire" signal is commanded. The area between the curves provides system tolerances, i.e. conditions under which an output signal may be commanded, depending on a sequence or accumulation of acceleration and velocity change data which is defined by the crash criteria in the particular algorithm utilized.

Additional power cylinders, such as shown at 66' in FIG. 3, may be provided to give the system multi-shot capability to enable multiple retractions of harness 36. The output signal from ECSU 52 may also be utilized to initiate inflation of air bags or an IBAHRS (Inflatable Body and Head Restraint System) restraint system supplement. A single ECSU 52 may provide output signals for all aircrew harness retractors or a separate sensor may be provided for each. The crash sensor of this invention is applicable to any type of helicopter, to fixed wing aircraft, and to any vehicle which is subject to crashes in any of a multiplicity of directions.

Thus, this invention provides an ECSU for a vehicle which provides an output signal to activate a vehicle occupant safety device upon sensing a crash in any direction. The ECSU functions to sense a crash along any vector by simultaneously sensing accelerations along all three ECSU orthogonal axes. These acceleration signals are input to an MPU which converts them into accelerations on the vehicle's axes and analyzes them with a crash algorithm programmed into memory to determine when a crash has occurred. If so determined, an output signal is provided to an occupant safety device which secures an occupant in his seat to reduce injuries.

While only a preferred embodiment has been illustrated and described, obvious modifications thereof are contemplated within the scope of this invention and the following claims.

I claim:

1. A method of identifying a crash occurrence for any of a plurality of different vehicles to activate a vehicle safety device, comprising the steps of
   a. providing an electronic crash sensor for measuring accelerations along three orthogonal axes,
   b. programming the crash sensor with an algorithm which analyzes the accelerations along each axis to produce velocity change data and comparing these data to threshold criteria to determine an occurrence of a crash for any of the plurality of vehicles,
   c. programming the crash sensor to convert the data along the crash sensor's axes to data along the vehicle's axes when mounted in any of the plurality of vehicles,
   d. mounting the crash sensor in one of the plurality of vehicles in a manner which identifies said one vehicle to provide the threshold criteria and axis conversions of said one of the plurality of vehicles for use by the crash sensor,
   e. repeatedly measuring vehicle accelerations along the crash sensor's axes to provide measured axis accelerations, converting the measured axis accelerations to converted vehicle axis accelerations, and analyzing the converted vehicle axis accelerations to determine the presence or absence of an acceleration crash pulse, and for as long as the presence of an acceleration crash pulse is determined, engaging a recorder and starting an elapsed time measurement to provide a cumulated time value, repeating said measuring and converting steps to provide successive converted vehicle axis acceleration values and integrating said successive converted vehicle axis acceleration values to provide converted velocity changes and cumulating said converted velocity changes to provide a cumulated velocity change value and analyzing the cumulated velocity change value to determine the presence or absence of a velocity change crash threshold and if the presence of a velocity change crash threshold is determined, comparing said cumulated time value required to reach said velocity change crash threshold with pre-programmed cumulated time values and if said cumulated time value is within said pre-programmed cumulated time values concluding that a crash has occurred, and
   f. providing an activation signal to the safety device when a conclusion is reached that a crash has occurred.

2. The method of claim 1, including the step of
   g. providing each vehicle with a unique connector which mates with a crash sensor connector to identify each vehicle to the crash sensor.

3. The method of claim 2, including the steps of
   h. integrating measured vehicle accelerations to produce orthogonal velocity changes,
   i. normalizing said velocity changes, and
   j. combining said velocity changes and comparing them with velocity criteria to identify occurrence of a crash threshold.

4. An electronic crash sensor for use in a plurality of vehicles comprising
   solid state accelerometers for measuring accelerations along 3 orthogonal axes and producing acceleration signals,
   a microprocessor-based controller for receiving and analyzing the acceleration signals to determine occurrence of a crash threshold, and for providing safety device control signals when a crash threshold occurs,
   means for mounting the crash sensor in a vehicle,
   means for identifying said vehicle to the crash sensor,
   a nonvolatile programmable memory having a vehicle identification program which identifies the orientation of the crash sensor's orthogonal axes relative to the vehicle's axes for each of the plurality of vehicles and converts the crash sensor's measured axis accelerations into vehicle axis accelerations,
   a control program in said memory containing a crash detection algorithm for analyzing accelerations to determine occurrence of a crash for each of the plurality of vehicles, and
   an external communication port enabling control program modification and data retrieval, whereby
   the controller repeatedly samples the acceleration signals and utilizes the programs to identify occurrence of a vehicle crash and provide said safety device control signals.

5. The electronic crash sensor of claim 4, including a program for storing vehicle acceleration data in said memory.

6. The electronic crash sensor of claim 4, wherein the means for identifying said vehicle to the crash sensor comprises a connector on the crash sensor and a mating connector on each vehicle which has a physical interface specific to that vehicle.

7. The electronic crash sensor of claim 4, including a digital data bus on the crash sensor enabling communication with, and control of, subsystems on the vehicle.

8. A method of evaluating vehicle acceleration data measured along three measurement axes to identify a predetermined event, which is defined by vehicle acceleration and/or velocity criteria on three vehicle axes which are different from the measurement axes, and to command vehicle safety systems actions, comprising the steps of a. converting measurement axis acceleration data into vehicle axis acceleration data, b. applying the converted data to an algorithm which includes one or more of
predetermined acceleration thresholds,
rate of velocity changes, and
magnitude of velocity changes,
for each vehicle axis to perform an analysis which determines the occurrence of said predetermined event, c. commanding vehicle safety systems actions in response to determination of occurrence of said predetermined event, and d. recording event data for later retrieval.

9. A process for activating an air crew safety device comprising:

mounting a tri-axis accelerometer on an aircraft, said tri-axis accelerometer providing electronic acceleration data along three orthogonal axes, an X axis, a Y axis and a Z axis;

loading an algorithm in a microcontroller processing unit and inputting data limits specific to the aircraft on which the tri-axis accelerometer is mounted to enable said algorithm to determine if a crash threshold has occurred;

repeatedly sampling acceleration values received from said tri-axis accelerometer along said X, Y and Z axes to provide current acceleration values along each axis;

normalizing said current acceleration values by dividing by a normalized coefficient to provide current normalized acceleration values along each axis, squaring said current normalized acceleration values and summing the squared current normalized acceleration value for the X axis and the Y axis and the Z axis to provide a tri-axis summed current normalized acceleration value;

comparing said tri-axis summed current, normalized acceleration value to a pre-programmed acceleration value and if it exceeds said pre-programmed acceleration value, engaging an integrator;

if said integrator is engaged, integrating said current acceleration values to calculate current change in velocity values along each of said axes;

if said integrator is engaged, adding the current change in velocity to any previous changes in velocity values calculated while said integrator is engaged to provide a cumulative changes in velocity along each of said axes and determining the cumulative time that the integrator has been engaged;

normalize said cumulative changes in velocity along each of said axes by dividing by a normalizing velocity coefficient to calculate normalized cumulative changes in velocity along each axis;

raising said normalized cumulative changes in velocity along each axis to a pre-programmable power to provide raised, normalized velocity changes along each axis;

summing the raised, normalized velocity change calculated along the X axis to that calculated along the Y axis and to that calculated along the Z axis to reach a cumulative, triaxial normalized velocity result; and evaluating the cumulative, triaxial normalized velocity result and the time that the integrator has been engaged to reach said result and compare to a pre-programmed value and if said result is within said pre-program med value, activate air crew safety devices.

10. The process of claim 9 further including the step of mounting the tri-axis accelerometer in an orientation wherein the X, Y and Z axes of said tri-axis accelerometer are not all parallel to respective X, Y and Z axes of said aircraft and before said normalizing the current acceleration values step, converting acceleration data from the axes of said tri-axis accelerometer to vehicle X, Y and Z axes acceleration values and using the calculated vehicle X, Y and Z axes acceleration values in all steps following said normalizing step.

* * * * *